(12) United States Patent
Jung et al.

(10) Patent No.: US 10,462,272 B2
(45) Date of Patent: Oct. 29, 2019

(54) ELECTRONIC DEVICE INCLUDING HOUSING HAVING AT LEAST ONE THROUGH HOLE

(71) Applicant: Samsung Electronics Co., Ltd., Gyeonggi-do (KR)

(72) Inventors: Min Su Jung, Seoul (KR); Jae Wan Kim, Gyeonggi-do (KR); Sung Won Hong, Gyeonggi-do (KR); Kwang Tai Kim, Gyeonggi-do (KR); Seung Ah Oh, Seoul (KR); Jung Won Lee, Gyeonggi-do (KR); Jong Chul Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/945,899

(22) Filed: Apr. 5, 2018

(65) Prior Publication Data

US 2018/0295222 A1 Oct. 11, 2018

(30) Foreign Application Priority Data

Apr. 6, 2017 (KR) .......................... 10-2017-0044967

(51) Int. Cl.
*H04M 1/00* (2006.01)
*H04M 1/02* (2006.01)

(52) U.S. Cl.
CPC ....... *H04M 1/0266* (2013.01); *H04M 1/0264* (2013.01); *H04M 2250/22* (2013.01)

(58) Field of Classification Search
CPC . H04M 1/0266; H04M 1/0264; H01L 27/323; G06F 3/1446
(Continued)

(56) References Cited

U.S. PATENT DOCUMENTS 8,743,088 B2 6/2014 Watanabe
9,016,917 B2 4/2015 Fujita et al.
(Continued)

FOREIGN PATENT DOCUMENTS

KR 20-0226320 Y1 3/2001
KR 10-2012-0021608 A 3/2012
(Continued)

OTHER PUBLICATIONS

International Search Report dated Jul. 17, 2018.

*Primary Examiner* — Sonny Trinh
(74) *Attorney, Agent, or Firm* — Cha & Reiter, LLC.

(57) ABSTRACT

An electronic device includes a housing including a first surface, a second surface, and a third surface defining an internal space of the housing, a touch screen display interposed between the first surface and the second surface, and a sensor module disposed under the touch screen display and including a light emitting unit and a light receiving unit, wherein the third surface includes a plurality of through holes each including optical structures, wherein a portion of light emitted from the light emitting unit is guided to an exterior of the electronic device through a first optical structure of a first through hole, and wherein at least a portion of light introduced from the exterior of the electronic device is guided to the light receiving unit on a second optical structure of a second through hole.

20 Claims, 12 Drawing Sheets

(58) Field of Classification Search
USPC .............................................. 455/566, 550.1
See application file for complete search history.

(56) References Cited

U.S. PATENT DOCUMENTS

| | | | |
|---|---|---|---|
| 9,664,555 | B2 | 5/2017 | Shiu et al. |
| 9,859,936 | B2 | 1/2018 | Lee et al. |
| 2011/0115705 | A1 | 5/2011 | Watanabe |
| 2013/0329419 | A1 | 12/2013 | Fujita et al. |
| 2014/0166867 | A1 | 6/2014 | Shiu et al. |
| 2016/0147264 | A1* | 5/2016 | Kil .................. G06F 1/1626 345/173 |
| 2016/0360632 | A1 | 12/2016 | Lee et al. |
| 2017/0094821 | A1* | 3/2017 | Allore ............... B29C 45/14311 |
| 2018/0031728 | A1* | 2/2018 | Han ......................... G01J 1/42 |
| 2018/0196475 | A1* | 7/2018 | Bao ....................... G06F 1/1684 |

FOREIGN PATENT DOCUMENTS

| | | |
|---|---|---|
| KR | 10-2014-0145068 A | 12/2014 |
| KR | 10-2015-0084159 A | 7/2015 |
| KR | 10-2016-0080048 A | 7/2016 |

\* cited by examiner

ELECTRONIC DEVICE INCLUDING HOUSING HAVING AT LEAST ONE THROUGH HOLE

CROSS-REFERENCE TO RELATED APPLICATION(S)

This application is based on and claims priority under 35 U.S.C. § 119 to Korean Patent Application No. 10-2017-0044967, filed on Apr. 6, 2017, in the Korean Intellectual Property Office, the disclosure of which is incorporated by reference herein its entirety.

TECHNICAL FIELD

The present disclosure relates to a mounting structure for elements of an electronic device.

BACKGROUND

Recently, electronic device have developed to the point of supporting the utilization of various information resources without the limitation of time or location in an operating environment. Correspondingly, attention has been paid to the importance of developing a display which processes the recognition (e.g., an input) and expression (e.g., an output) of the information resources and functions as an interface between the electronic device and a user. Accordingly, various types of displays have been set forth in which the most advanced technologies are concentrated. One of such display is a full screen display to provide a large-area screen region.

The above information is presented as background information only to assist with an understanding of the present disclosure. No determination has been made, and no assertion is made, as to whether any of the above might be applicable as prior art with regard to the present disclosure.

SUMMARY

The full-screen display may be closely associated with minimizing a bezel region surrounding a screen region (active area), that is, implementing a zero bezel (or bezel-less). However, since the conventional bezel region includes a structural element (e.g., a through hole) associated with the operation of the function (e.g., a call function, a capturing function, a sensing function, or the like) of the electronic device, the bezel region has constrained the area of the display from being largely widened.

Aspects of the present disclosure are to address at least the above-mentioned problems and/or disadvantages and to provide at least the advantages described below. Accordingly, an aspect of the present disclosure is to provide an electronic device capable of enlarging a screen region of a display by minimizing a bezel region as the mounting structure of at least some of elements in the electronic device is improved.

In accordance with an aspect of the present disclosure, an electronic device may include a housing including a first surface, a second surface, and a third surface defining an internal space of the housing, a touch screen display interposed between the first surface and the second surface, a sensor module disposed under the touch screen display and including a light emitting unit and a light receiving unit, a wireless communication circuit disposed in the internal space, wherein the third surface includes a plurality of through holes each including optical structures, the plurality of through holes formed at a specified angle relative to a plane of the first and second surfaces, wherein a portion of light emitted from the light emitting unit is guided to an exterior of the electronic device through a first optical structure of a first through hole, and wherein at least a portion of light introduced from the exterior of the electronic device is guided to the light receiving unit on a second optical structure of a second through hole.

According to an embodiment, an electronic device is disclosed including a housing including a first surface, a second surface, and a third surface forming along an edge of the first surface, wherein the third surface includes a plurality of through holes arranged along the edge of the first surface, a touch screen display interposed between the first surface and the second surface, a wireless communication circuit disposed in an internal space of the housing, a first light guide having a convex surface disposed within a first through hole and exposed to an exterior of the electronic device, a second light guide disposed within a second through hole, an infrared light source disposed in the internal space such that emitted light passes through the first light guide to the exterior of the electronic device, and an infrared light detector disposed in the internal space to detect the emitted light when the emitted light passes through the second light guide after reflection by an external object.

According to an embodiment, at least one region of the third surface may include at least one through hole which is arranged while forming a specified angle with the third direction.

According to an embodiment, the at least one through hole includes plurality of through holes and the through holes may include an optical structure.

According to an embodiment, a first through hole of the through holes may guide at least a portion of light emitted from the light emitting unit to an outside of the electronic device, based on an optical structure.

According to an embodiment, a second through hole of the through holes may guide at least a portion of light, which is introduced from the outside of the electronic device, to the light receiving unit, based on an optical structure.

As described above, according to various embodiments, the optimized interface to a user may be supported based on the enlargement of a screen region of a display.

According to various embodiments, a viewing environment for providing the sensation of immersion for a user when content is output may be made based on the enlargement of the screen region of the display.

Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

In the following description made with respect to the accompanying drawings, the same or similar elements will be assigned with the same or similar reference numerals.

DETAILED DESCRIPTION

Figure 1:
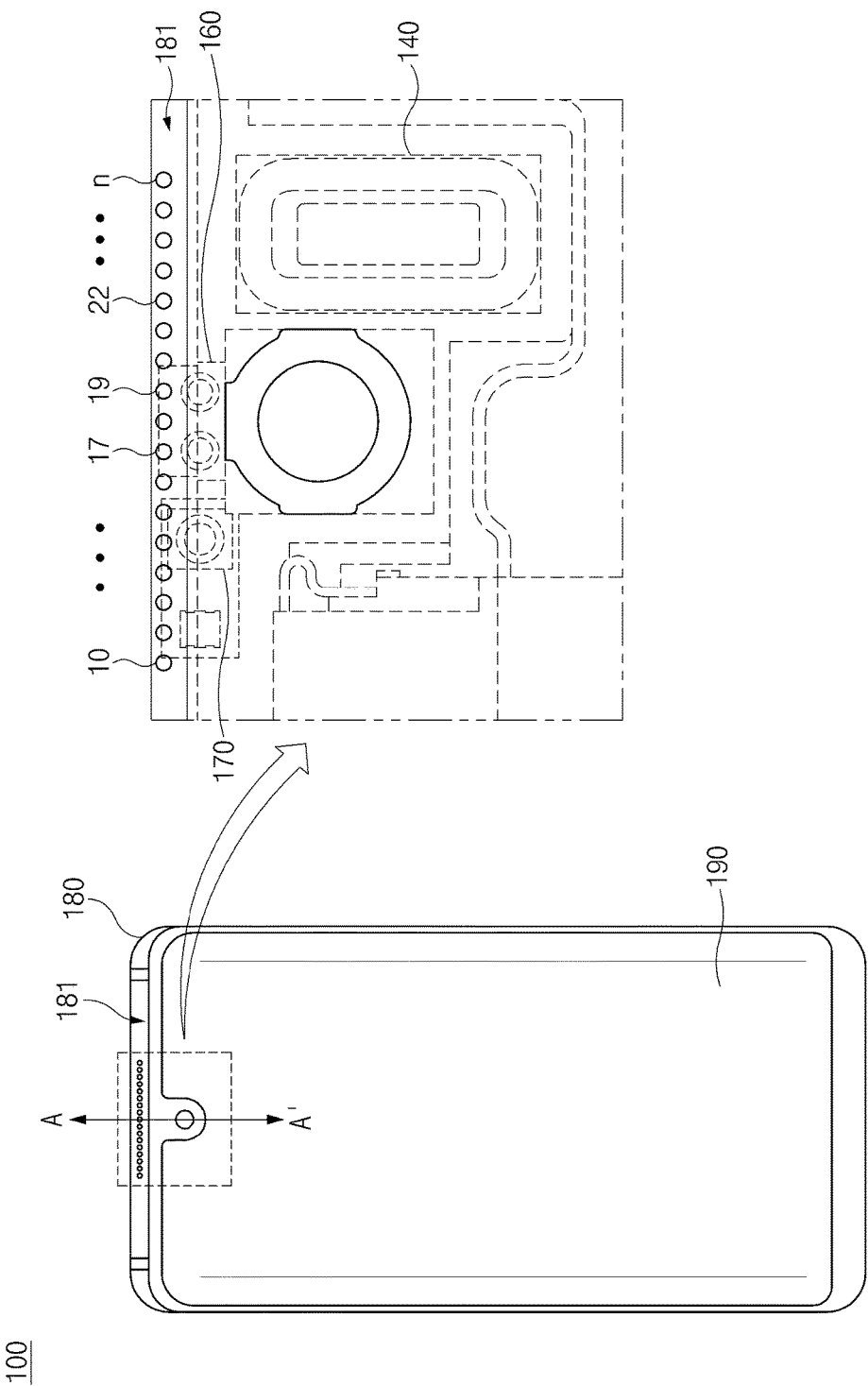
FIG. 1 is a view illustrating an electronic device and one region of the electronic device, according to an embodiment.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the appended claims and their equivalents. With respect to the descriptions of the accompanying drawings, like reference numerals refer to like elements.

The terms and words used in the following description and claims are not limited to their dictionary definitions, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to using various different elements of various embodiments of the present disclosure, but are not intended to limit the elements. For instance, "a first user device" and "a second user device" may indicate different users regardless of order or importance. For example, a first component may be referred to as a second component and vice versa without departing from the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a view illustrating an electronic device and one region of the electronic device, according to an embodiment. In FIG. 1, an enlarged drawing of one region of the electronic device is provided. The enlarged drawing may be understood as illustrating that the electronic device has no cover glass or is seen through the cover glass.

Referring to FIG. 1, an electronic device 100 may have at least one element supporting a function of the electronic device 100 at a specified region (e.g., an upper region) disposed under a cover glass 190. For example, the electronic device 100 may have at least one of a receiver module 140 supporting a communication function, a sensor module 160 to support a sensing function, a light emitting diode (LED) module 170 to support an image capturing function (or, illumination function). The above-described at least one modules 140, 160, or 170 may be mounted in a specified arrangement manner or a specified sequence formed therebetween in or on a housing of the electronic device. The mounting region for each module on the electronic device 100 may be varied corresponding to the size, the area, or the volume of each module.

According to an embodiment, the at least one module 140, 160, or 170 may be mechanically or operatively associated with a part of one or more holes (10-to-n) formed in one region of the electronic device 100. For example, the first module (e.g., any one of 140, 160, or 170) may be linked to at least one first hole (e.g., some of the one or more through holes 10-to-n) corresponding to (close to) the relevant mounting position, and the at least one first hole may not be repeatedly linked to another module.

According to an embodiment, the one or more holes 10-to-n may be formed in a housing 180 of the electronic device 100. For example, the one or more holes 10-to-n may be formed in one side surface region 181 of the housing 180. The one or more holes 10-to-n may be arranged at regular distances while being spaced apart from each other or may be arranged at regular distances in bilaterally symmetrical manner. Each of the one or more holes 10-to-n (hereinafter, referred to as "through hole") may be formed with a specified diameter through the side surface region 181 and may support at least one module 140, 160, or 170 in performing the function thereof. For example, the one or more through holes 10-to-n may serve as a guide path for emitting or receiving light in a specified wavelength band or a guide path for sound output, depending on the module associated with the one or more through holes 10-to-n. According to various embodiments, a through hole, which is not associated with the modules 140, 160, or 170, of the one or more through holes 10-to-n, may be closed in the inner portion thereof while maintaining the shape of a hole when viewed from the outside of the electronic device 100, with regard to preventing foreign matters from being introduced into the through hole.

As described above, the one or more through holes 10-to-n may be linked to the relevant module 140, 160, or 170 to serve as an interface associated with performing the function of the relevant module 140, 160, or 170. In this connection, the one or more through holes 10-to-n formed in the housing 180 may have a structure characteristic (e.g., a shape characteristic) to improve the relative position relationship with the modules 140, 160, or 170 or to overcome space confinement in the electronic device 100. Alternatively, at least some of the one or more through holes 10-to-n may have functional characteristics (e.g., optical characteristics) to improve the efficiency of a function of the relevant module 140, 160, or 170 or to optimize the function. Hereinafter, the structural or functional relationship between the one or more through holes 10-to-n and the modules 140, 160, or 170 will be described and various embodiments associated with the structural or functional relationship will be described.

Figure 2A:
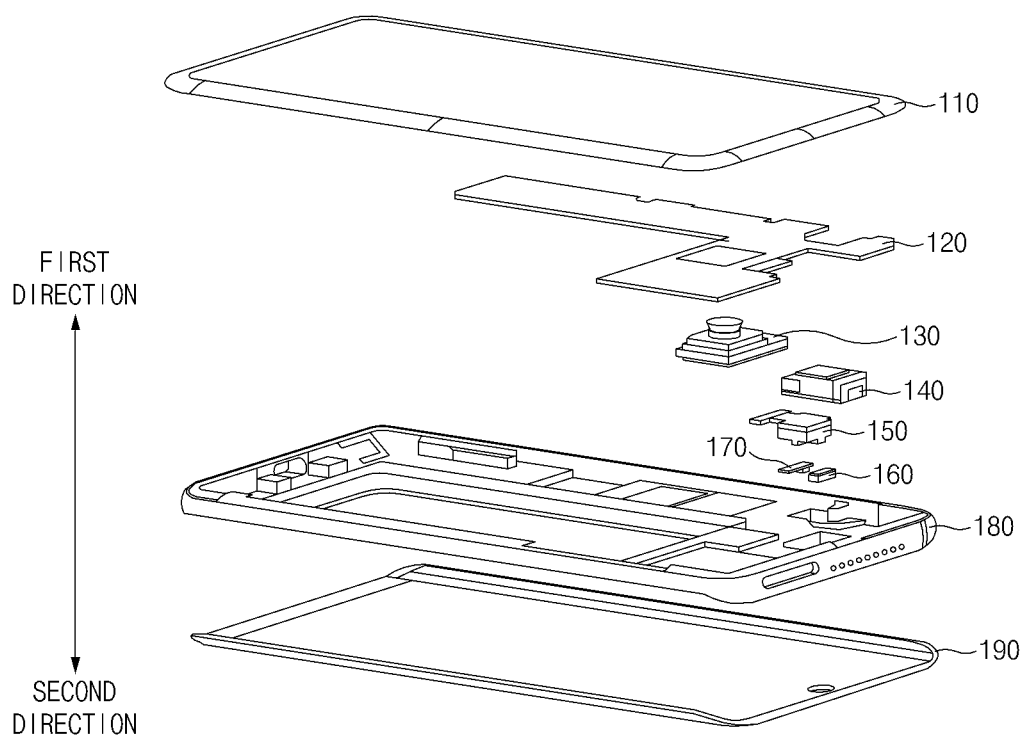
FIG. 2A is a view illustrating some elements of the electronic device, according to an embodiment.
Figure 2B:
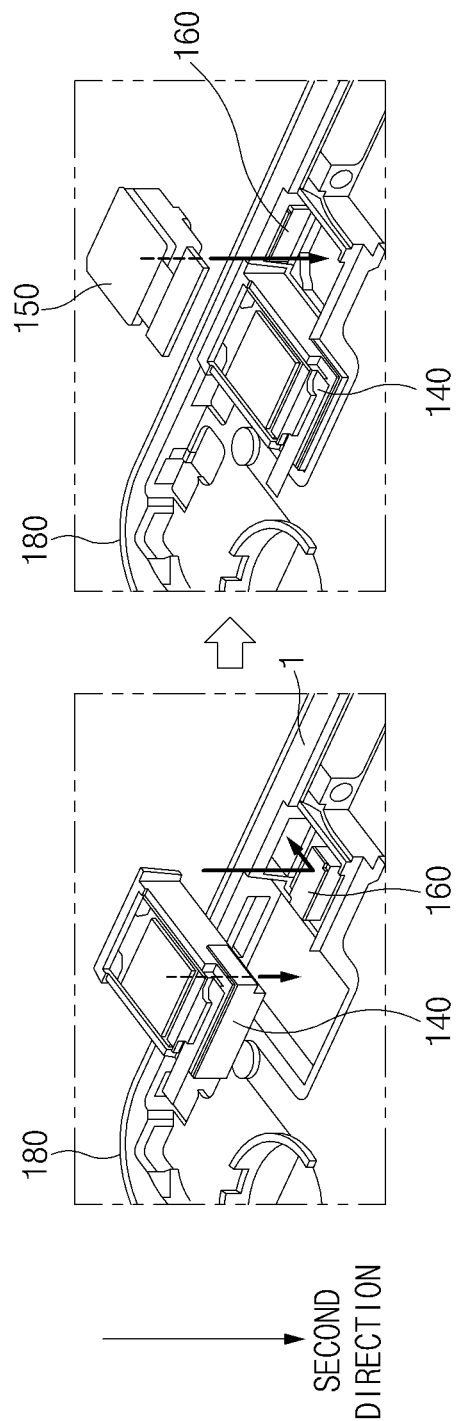
FIG. 2B is a view illustrating mounting shapes of some elements of the electronic device, according to an embodiment.

FIG. 2A is a view illustrating some elements of the electronic device, according to an embodiment, and FIG. 2B is a view illustrating mounting shapes of some elements of the electronic device, according to an embodiment.

Referring to FIG. 2A, the electronic device 100 may include at least one of a rear case 110, a printed circuit board 120, a first camera module 130, the receiver module 140 (or a speaker module), a second camera module 150, the sensor module 160, the light emitting device (LED) module 170, the housing 180, or the cover glass 190.

According to various embodiments, the electronic device 100 may not include at least one of the above-described elements or may further include other element(s). For example, the electronic device 100 may further include a processor, a memory, a display (or a touch screen display), or a communication module (or a communication circuit) in addition to the above-described elements. The processor is electrically connected with other elements (e.g., the first camera module 130, the receiver module 140, the second camera module 150, the sensor module 160, the LED module 170, or the like) of the electronic device 100 to perform an overall control, a communication computation, or data processing for the elements. The processor may include at least one of a central processing unit (CPU), an application processor (AP), or a communication processor (CP). The memory may include at least one of a volatile memory or a non-volatile memory and may store a command, information, or data associated with performing functions of the elements (e.g., the first camera module 130, the receiver module 140, the second camera module 150, the sensor module 160, the LED module 170, or the like). The display may output various types of content (e.g., a text, an image, a video, an icon, a symbol, or the like). The display may include, for example, a liquid crystal display (LCD), a light-emitting diode (LED) display, an organic LED (OLED) display, or a microelectromechanical systems (MEMS) display. The communication module may transmit or receive various types of data, information, or signals by making wired or wireless communication with at least one external device based on a specified protocol. According to an embodiment, the communication module may be electrically connected with the housing 180.

The rear case 110, the housing 180, and the cover glass 190 are coupled to each other in one region thereof to form an outer appearance of the electronic device 100. According to an embodiment, an edge region of the housing 180 may extend by a predetermined length in a first direction and a second direction. Accordingly, the housing 180 may include an internal space open in the first direction and an internal space open in the second direction. According to various embodiments, at least one region of the housing 180 may include a metal material and include a region (e.g., a side surface) curved with a specified curvature. At least one region of the cover glass 190 may be inserted into the internal space open in the second direction and may be coupled to the housing 180, for example, by an adhesive member. Correspondingly, at least one region of the rear case 110 may be inserted into the internal space open in the first direction and may be coupled to the housing 180 such that the rear case 110 is detachable from the housing 180 thereafter. In this connection, at least one protrusion part is formed on one region (e.g., an edge) of at least one of the rear case 110 or the housing 180 and at least one receiving part corresponding to the at least one protrusion part may be included in one region (e.g., an edge) of a remaining one of the rear case 110 or the housing 180. The at least one protrusion part and receiving part may be engaged with each other by external force and may be released from the engagement state.

According to an embodiment, a housing of the electronic device 100 may be referred to as not only the housing 180 illustrated in FIG. 2A, but the structure in which, the housing 180, the rear case 110, and the cover glass 190 are assembled with one another. Based on this, the housing 180 of the electronic device 100 may include at least one of a first surface (e.g., an outer surface of the rear case 110) facing the first direction or a second surface (e.g., an outer surface of the cover glass 190) facing the second direction. According to various embodiments, the cover glass 190 is just a name of an element, and the material of the cover glass 190 is not limited to glass. For example, at least a portion of the cover glass 190 may include a flexible film material with regard to the implementation of a flexible characteristic of the electronic device 100.

The printed circuit board 120, the first camera module 130 (e.g., the rear camera), the receiver module 140 (or a speaker module), the second camera module 150 (e.g., a front camera), the sensor module 160, or the light emitting device (LED) module 170 may be received in the internal space of the electronic device 100 formed as the rear case 110, the housing 180, and the cover glass 190 assembled with one another. At least one electronic component or electronic device (e.g., a processor, a memory, a communication module, a circuit line, or the like) associated with the function operation of the electronic device 100 may be mounted on the printed circuit board 120. According to an embodiment, a plurality of printed circuit boards 120 may be provided and at least some of the printed circuit boards 120 may be electrically connected with each other. The first camera module 130 and the second camera module 150 may be utilized to capture images or videos of a surrounding environment of the electronic device 100. The first camera module 130 and the second camera module 150 may be arranged on opposing portions (e.g., a rear portion or a front portion of the electronic device 100) of the electronic device 100 to enable capture of mutually different fields of view. The receiver module 140 (or a speaker) may convert a signal generated from the electronic device 100 or received from an external device into vibration and may output a sound. According to an embodiment, the sensor module 160 may include a proximity sensor. The proximity sensor may sense an object disposed (or, approaching the electronic device 100) around the electronic device 100 by emitting and/or receiving light (e.g., infrared light) using a specified wavelength band. The LED module 170 (or a visible light source) may support a flash function used when capturing images by operation of the first camera module 130 or the second camera module 150. Alternatively, the LED module 170 may increase illuminance for a surrounding environment of the electronic device 100 by operating under the control of the user, regardless of the driving of the camera module.

Referring to FIG. 2B, the receiver module 140, the second camera module 150, and the sensor module 160 may be mounted in a pre-specified mounting sequence of the modules, with regard to the structural or functional link to the above-described one or more through holes 10-to-n (see FIG. 1). In this connection, one region (e.g., such as an upper region of the electronic device 100) of the housing 180 facing the second direction will be configured with the frame structure 1 having the shape corresponding to the modules 140, 150, or 160. The module 140, 150, or 160 may be fixed onto the frame structure 1 by using an additional adhesive member (e.g., a tape, or the like) or a coupling member (e.g., a screw or the like). In this case, the second camera module 150 and the sensor module 160 may be mounted on a common partial region of the frame structure 1. In addition, at least one region of the second camera module 150 may be requested to be exposed to the outside with regard to the capturing function operation of the second camera module 150. Based on this, the receiver module 140 and the sensor module 160 may be primarily seated on the relevant mounting regions of the frame structure 1 of the housing 180. The second camera module 150 may be secondarily seated in the space of the frame structure 1 having the receiver module 140 and the sensor module 160 seated thereon.

Figure 3A:
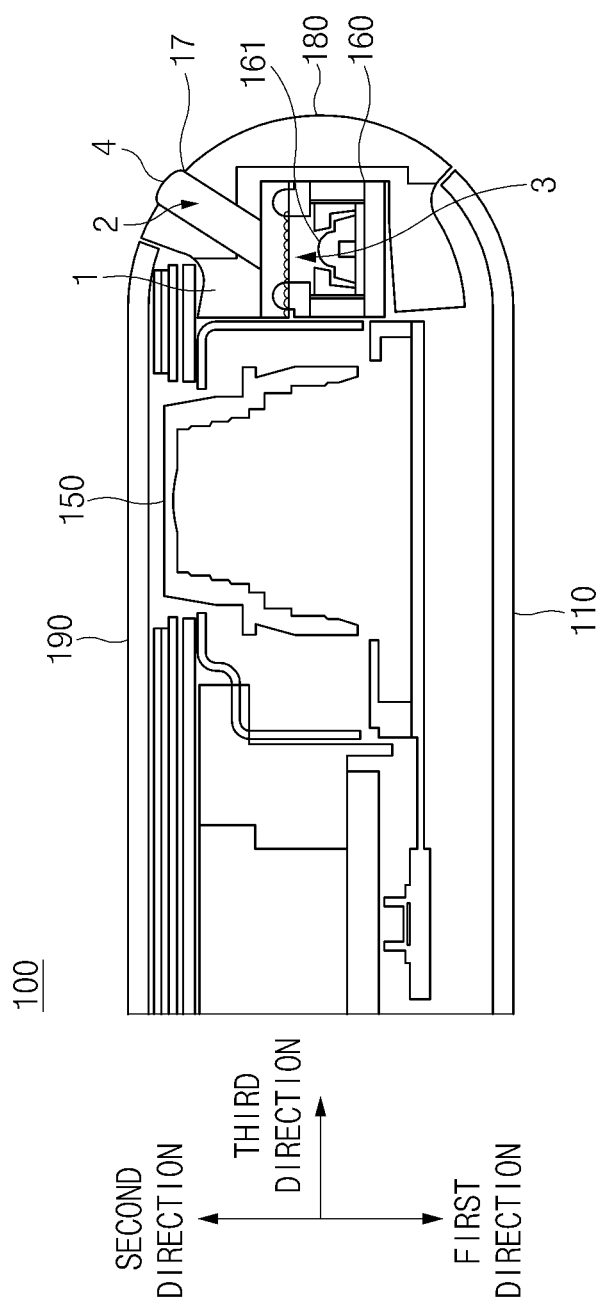
FIG. 3A is a sectional view taken in one direction of the electronic device, according to an embodiment.
Figure 3B:
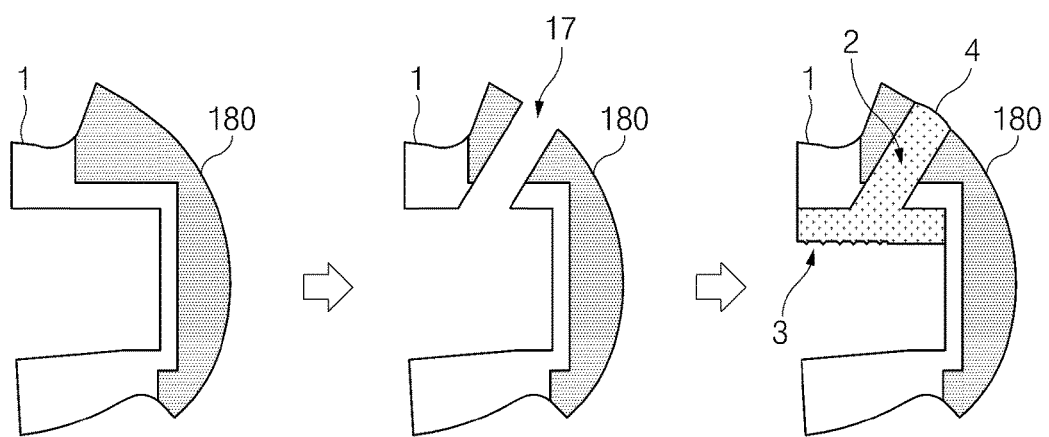
FIG. 3B is a view illustrating a machining process for one region of the electronic device, according to an embodiment.

FIG. 3A is a sectional view of the electronic device, according to an embodiment, and FIG. 3B is a view illustrating an example machining process for one region of the electronic device. The electronic device illustrated in FIG. 3A may be understood as being in a sectional shape as view from along line A-A' of FIG. 1, and the axis of a first through hole 17 of FIG. 1.

Referring to FIG. 3A, the electronic device 100 may include a third surface facing a third direction, which is coupled to the first surface (e.g., an outer surface of the rear case 110) facing the first direction, and the second surface (e.g., an outer surface of the cover glass 190) facing the second direction. The third surface may form a side surface of the housing 180, corresponding to an upper region of the electronic device 100 and may include a region with a specified curvature, as described above. The third direction may include, for example, a direction of the inclination of at least one through hole, which is to be described below. According to an embodiment, the receiver module 140 (see FIG. 2A), the sensor module 160 (see FIG. 2A), or the LED module 170 (see FIG. 2A) may be mounted substantially proximate to or even adjacent to the third surface. Hereinafter, the description will be made with reference to FIG. 3A regarding the structural relationship or functional relationship between a light emitting unit 161 of the sensor module 160 and the first through hole 17.

The light emitting unit 161 (or an infrared light source) may emit light in a specified wavelength band with regard to performing the function of the sensor module 160 (e.g., sensing an object adjacent to the electronic device 100). In this connection, the light emitting unit 161 may be linked to the first through hole 17 formed in one region of the third surface. For example, the light emitted from the light emitting unit 161 may be discharged to the outside of the electronic device 100 through the first through hole 17. According to an embodiment, the first through hole 17 may be formed with a prespecified inclination through the third surface to compensate for the distance from the light emitting unit 161 which is recessed by a specific distance from the third surface and mounted. The first through hole 17 may arrive at the mounting space of the light emitting unit 161 by extending while further passing through the frame structure 1 adjacent to the third surface. In this case, one end portion (e.g., a region introduced into the electronic device 100) of the first through hole 17, which extends, may be positioned on the central axis of the light emitting unit 161. Based on this, the inclination of the first through hole 17 may be specified.

According to an embodiment, at least a portion of the first through hole 17, may be modified to have an optical characteristic associated with improvement in the optical performance of the light emitting unit 161 (or the sensor module 160). For example, an optical structure 2 (or a light guide structure) may be formed in at least a portion of the inner region of the first through hole 17 and the mounting space of the light emitting unit 161. The optical structure 2 may include, for example, a resin material based on acryl or resin. According to another manner of improving the optical performance of the light emitting unit 161, a pattern 3 having a specified shape may be formed in one region (e.g., at least a portion of a region facing the light emitting unit 161) of the optical structure 2. The pattern 3 may guide at least a portion of light emitted from the light emitting unit 161 to the first through hole 17 by refracting the at least a portion of the light. According to another manner, one region (e.g., a region exposed to the outside of the electronic device 100) of the optical structure 2 may be implemented in a convex lens shape 4 with regard to the implementation of light concentration. Accordingly, the light guided to the first through hole 17 may be concentrated through the convex lens shape 4 and then discharged to the outside environment.

According to an embodiment, the second camera module 150 (e.g., a front camera) may be disposed in a region adjacent to the sensor module 160. At least a portion of an element (e.g., the display or the touch screen display) of the electronic device 100 provided at the upper region of the second camera module 150 or corresponding to the upper region may be excluded (e.g., cut or punched) from the upper region with regard to performing (e.g., capturing) the function of the second camera module 150.

According to various embodiments, the above-described structural relationship or functional relationship between the light emitting unit 161 and the first through hole 17 may be identically or similarly applied to the above-described LED module 170 (see FIG. 2A) and a specific through hole (e.g., a fourth through hole).

Referring to FIG. 3B, regarding the example machining process of the structure associated with the first through hole 17, the first frame structure 1 may be formed inside one region (e.g., a side surface) of the housing 180 through the first process. According to an embodiment, the frame structure 1 may be formed by injection-molding a polymer compound which is heated and melted onto the housing 180, and then cutting away at least a portion of the hardened polymer compound.

In the second process, the first through hole 17 may be formed in the assembly between the housing 180 and the frame structure 1. The first through hole 17 may be formed using a drilling process boring the housing 180 and the frame structure 1, using a specific inclination from one region of the housing 180.

In the third process, the optical structure 2 may be formed in the at least a portion of the first through hole 17 and the frame structure 1 with regard to the optical modification of the first through hole 17. The optical structure 2 may be, for example, formed in a series of processes coupling the assembly between the housing 180 and the frame structure 1 to a specified-shape cast, injecting melted resin into the first through hole 17, and removing the cast from the hardened resin. The third process may include a machining at least one region of the optical structure 2. For example, the third process may include a process of cutting the one region of the optical structure 2 using specified machine or tool to form a specifically shaped pattern 3. In addition, the third process may include a process of implementing a lens shape (e.g., a convex lens shape 4 or a concave lens shape (not illustrated) by additionally applying the resin or cutting a portion of the optical structure 2.

Figure 3C:
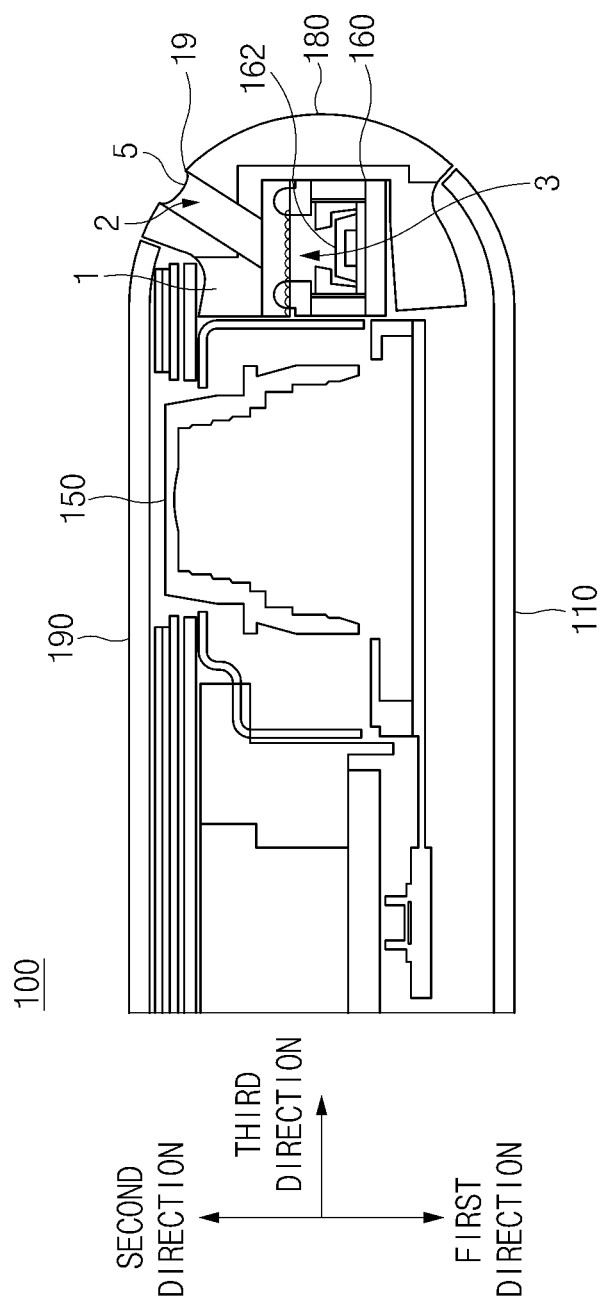
FIG. 3C is another sectional view taken in one direction of the electronic device, according to an embodiment.

FIG. 3C is another sectional view of the electronic device, according to an embodiment. The electronic device illustrated in FIG. 3C may be understood as being a sectional view taken along line A-A' of FIG. 1 and the axis of a second through hole 19 of FIG. 1. In the following description made with reference to FIG. 3C, elements the same to or similar to elements described with reference to FIG. 3A will be assigned with the same reference numerals and the details thereof will be omitted.

Referring to FIG. 3C, the sensor module 160 (see FIG. 2A) may include a light receiving unit 162 (or an infrared light detector) corresponding to the above-described light emitting unit 161 (see FIG. 3A). When light emitted from the light emitting unit 161 (or light discharged through the above-described first through hole 17 of FIG. 3A) is reflected from an arbitrary object, the light receiving unit 162 may receive the reflected light. In this connection, the light receiving unit 162 may be linked to the second through hole 19 formed in one region of the third surface facing the third direction. The second through hole 19 may guide the reflected light, which is introduced based on the optical structure 2, to the light receiving unit 162.

According to an embodiment, one region (e.g., a region exposed to the outside of the electronic device 100) of an optical structure 2 of the second through hole 19 may support the improvement of the optical performance of the light receiving unit 162 based on the specified shape. For example, one region of the optical structure 2 may be implemented in the concave lens shape 5 with regard to the implementation of the light concentration of the reflected light. Based on this, the reflected light introduced from the outside is concentrated through the concave lens shape 5 and may more densely pass through the optical structure 2.

Figure 3D:
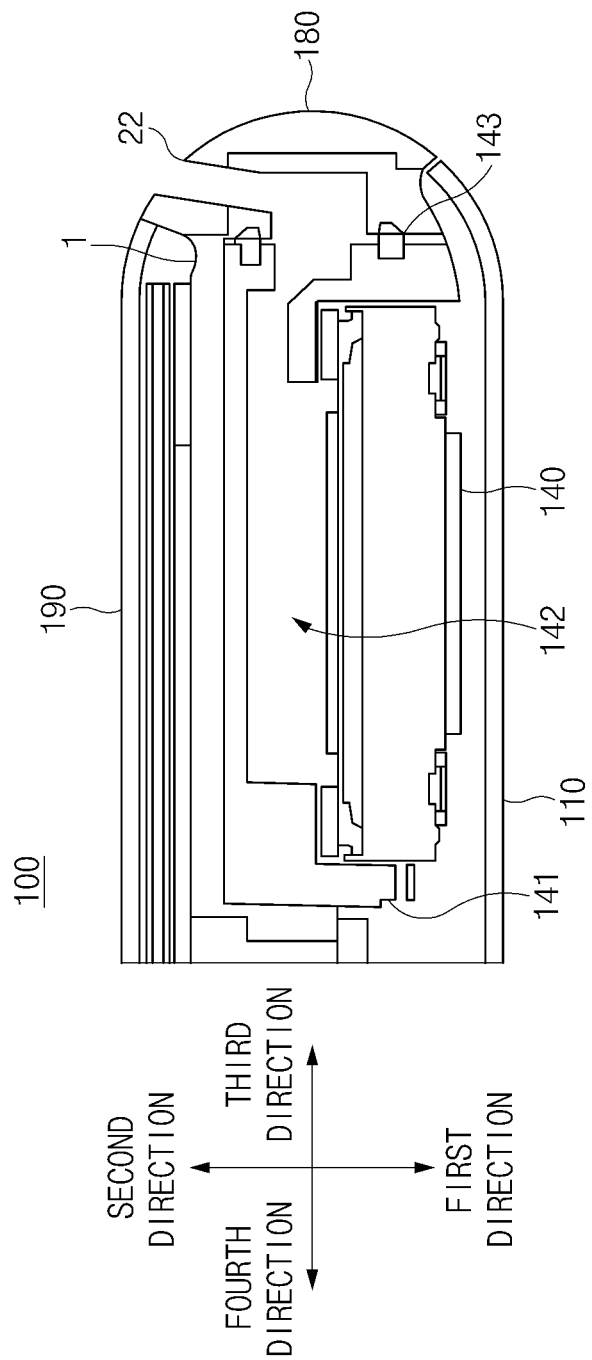
FIG. 3D is a still another sectional view taken in one direction of the electronic device, according to an embodiment.
Figure 3E:
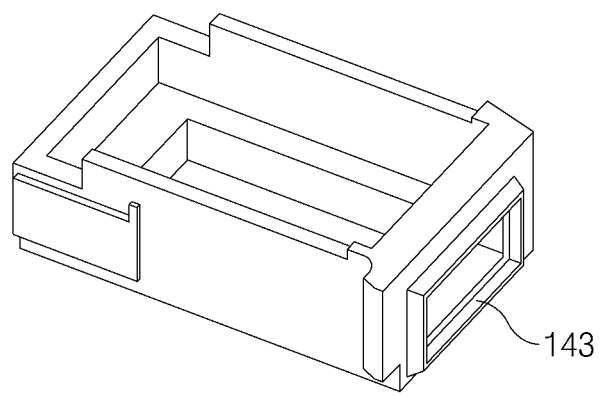
FIG. 3E is a view illustrating the shape of a case of receiving a receiver module, according to an embodiment.

FIG. 3D is another sectional view of the electronic device, according to an embodiment, and FIG. 3E is a view illustrating an example shape of a case receiving the receiver module, according to an embodiment. The electronic device illustrated in FIG. 3D may be understood as a sectional taken along line A-A' of FIG. 1 and taken along an axis of any one (hereinafter, referred to as the third through hole 22) of through holes 22-to-n (see of FIG. 1).

Referring to FIGS. 3D and 3E, the receiver module 140 performing sound conversion may be coupled to a case 141 (or a bracket) and mounted inside the electronic device 100. According to an embodiment, the assembly between the receiver module 140 and the case 141 may form an internal space 142 (or an internal space facing in the third direction or a fourth direction) which may take the form of a duct. The internal space 142 may function as a pathway for sound waves to travel through (e.g., the moving path of the medium) in the third direction with respect to the sound output from the receiver module 140. In this connection, at least one region of the internal space 142 may be open and the open region may be in communication with at least a portion of the third through hole 22 linked to the receiver module 140. According to various embodiments, the receiver module 140 may be linked to a plurality of third through holes (e.g., reference numbers 22-to-n of FIG. 1) formed in the region for the housing 180. Accordingly, the open region of the internal space 142 may communicate with the third through holes 22-to-n. In the case of the third through hole 22 or the third through holes 22-to-n, the above-described optical structure 2 (see FIG. 3A) may be excluded to prevent a sound from being blocked or attenuated when the sound is output to the outside of the electronic device 100.

According to an embodiment, the assembly between the receiver module 140 and the case 141 may include, in one region, a sealing member 143 having a degree of elasticity. The sealing member 143 may close the space between the assembly (or the case 141) and the frame structure 1 adjacent to the assembly. Based on this, the sound output from the receiver module 140 may be guided to the third through hole 22 or the third through holes 22-to-n without leaking to another space. In addition, according to various embodiments, the sealing member 143 may prevent foreign matter or moisture contamination from entry into the assembly.

Figure 4A:
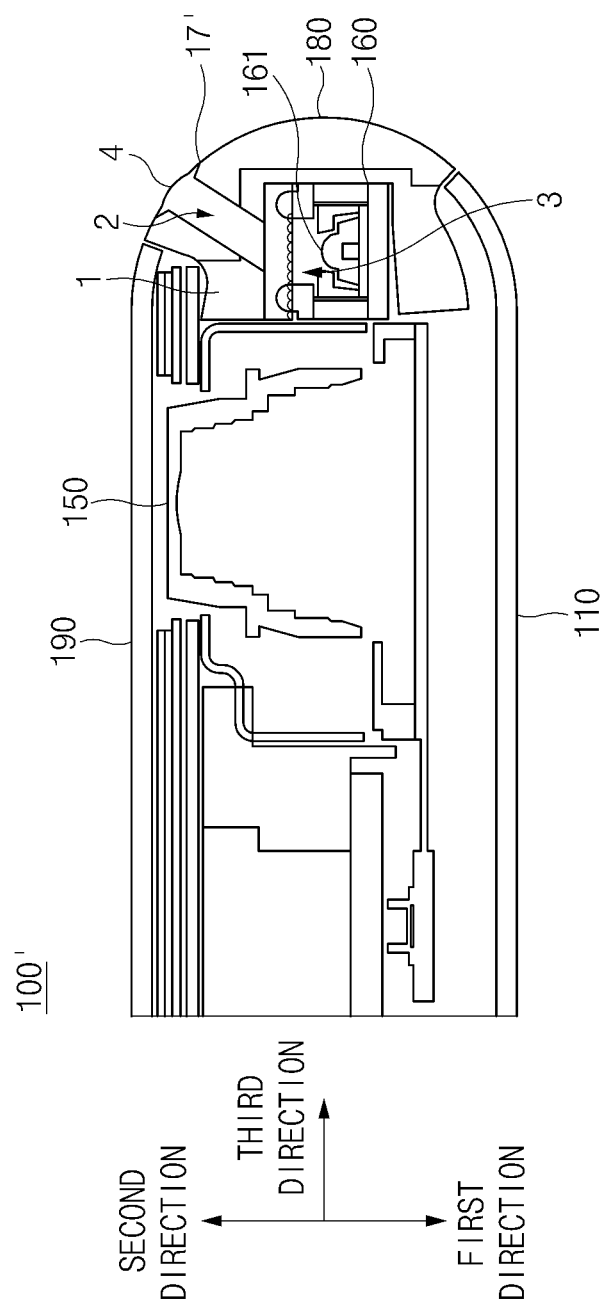
FIG. 4A is a sectional view taken in one direction of an electronic device, according to another embodiment.
Figure 4B:
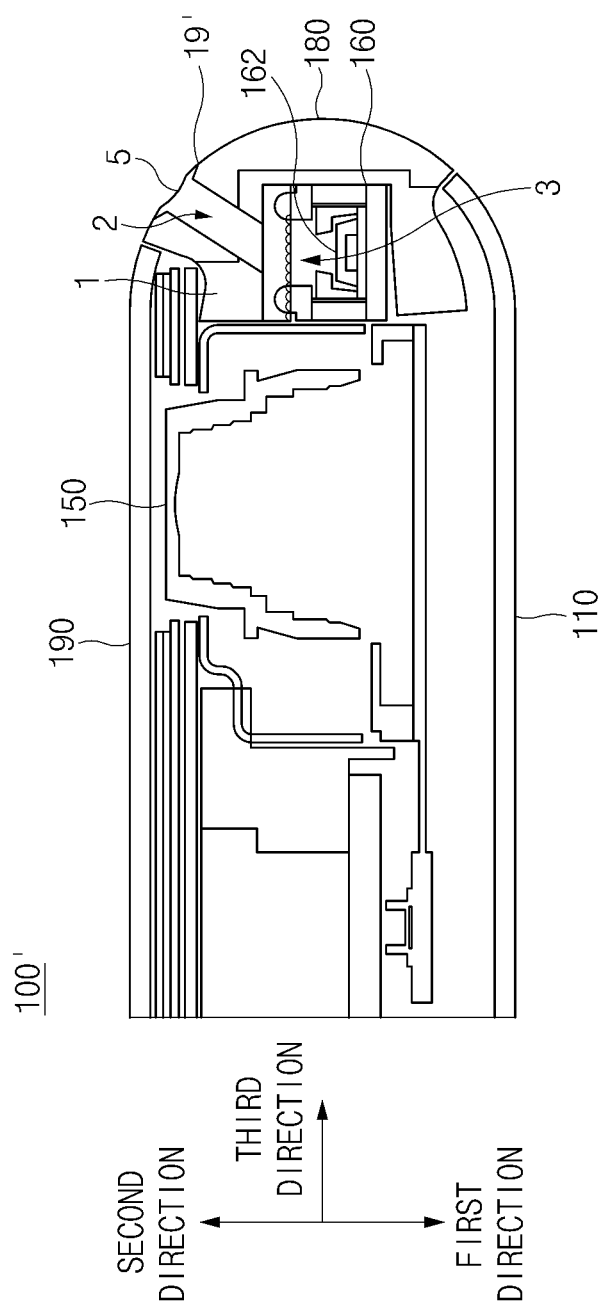
FIG. 4B is a sectional view taken in one direction of an electronic device, according to still another embodiment.

FIGS. 4A and 4B are sectional views of the electronic device, according to other embodiments. In the following description made with reference to FIGS. 4A and 4B, elements the same to or similar to elements described with reference to FIG. 3A will be assigned with the same reference numerals and the details thereof will be omitted.

Referring to FIG. 4A, according to an embodiment, an electronic device 100' may include at least a portion of the structural or functional characteristic of the electronic device 100 described with reference to FIG. 3A. However, according to another embodiment, the electronic device 100' may include a through hole having another modification associated with the improvement of the optical performance of the light emitting unit 161. For example, a first through hole 17' linked to the light emitting unit 161 may be machined in such a manner that at least one region (e.g., a region exposed to the outside) of the light emitting unit 161 is enlarged in area (or, a diameter). Accordingly, the quantity of light discharged to the outside from the light emitting unit 161 may be increased.

Referring to FIG. 4B, corresponding to the description made with reference to FIG. 4A, according to another embodiment, an externally exposed region of a second through hole 19' linked to the light receiving unit 162 may be machined and enlarged. The expanded region may improve the optical performance of the light receiving unit 162 by increasing the quantity of the reflected light introduced from the outside.

Figure 5:
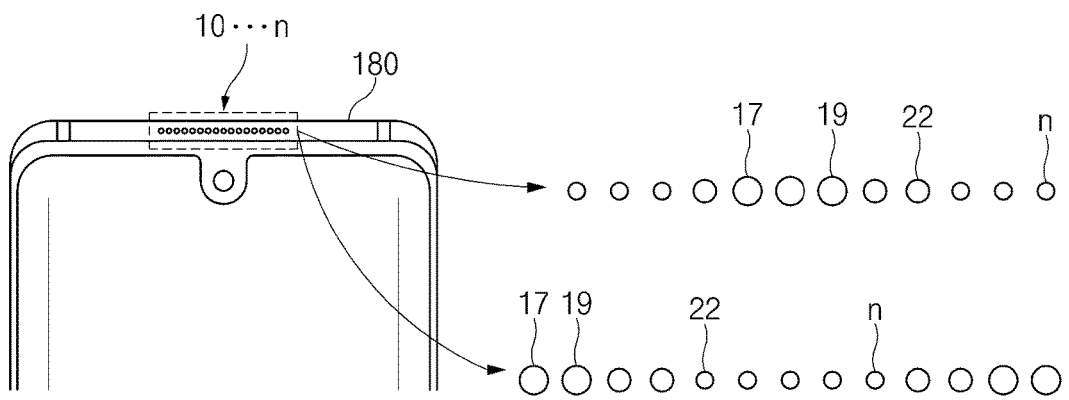
FIG. 5 is a view illustrating an arrangement shape of some elements of an electronic device, according to an embodiment.

FIG. 5 is a view illustrating an arrangement shape of some elements of the electronic device, according to an embodiment.

Referring to FIG. 5, the one or more through holes 10-to-n formed in the housing 180 of the electronic device 100 may have various shapes depending on the designs or the functions of the electronic device 100. In this connection, according to an embodiment, the one or more through holes 10-to-n may have the same size or similar sizes or may have partially different sizes. For example, at least some (e.g., the first through hole 17 or 17' and the second through hole 19 or 19' linked to the sensor module 160 (FIG. 2A or 4A)) of the one or more through holes 10-to-n may be formed in first size larger than the size of another through hole with regard to the improvement of the optical performance of the sensor module 160. According to various embodiments, the through hole (e.g., the first through hole 17 or 17' and the second through hole 19 or 19') in the first size may be positioned in the middle of the arrangement of the one or more through holes 10-to-n. In this case, one or more through holes arranged at both sides of the through hole having the first size may have the size gradually reduced from the first size or may have a second size less than the first size.

Alternatively, when through holes (e.g., the first through hole 17 or 17' and the second through hole 19 or 19') having the first size are positioned at one end region of the arrangement of the one or more through holes 10-to-n, through holes positioned at another end region may be formed in size equal to the first size, and at least one through hole interposed between both end regions may have a size gradually reduced from the first size or may have a second size less than the first size.

According to various embodiments, a plurality of through holes having the first size may be implemented. The first through hole 17 or 17' and the second through hole 19 or 19' applicable to the through hole having the first size may be concatenated with each other. Alternatively, the first through hole 17 or 17' and the second through hole 19 or 19' may be spaced apart from each other at the one end region while interposing at least one through hole having the first size between the first through hole 17 or 17' and the second through hole 19 or 19'. Alternatively, the first through hole 17 or 17' and the second through hole 19 or 19' may be positioned at both end regions and may be spaced apart from each other while interposing at least one through hole having the first size or a through hole having the second size between the first through hole 17 or 17' and the second through hole 19 or 19'.

The above-described electronic device (e.g., 100 of FIG. 1, 2A, 3A, 3C, 3D, 4A, or 4B) according to various embodiments may include a housing (e.g., 180 of FIG. 2A, 3A, 3C, 3D, 4A, or 4B) including a first surface (e.g., the side of the rear case 110 of FIG. 2A, 3A, 3C, 3D, 4A, or 4B) facing a first direction, a second surface (e.g., the side of the cover glass 190 of FIG. 2A, 3A, 3C, 3D, 4A, or 4B) facing a second direction opposite to the first direction, and a third surface connected with the first surface and the second surface and facing a third direction, a touch screen display interposed between the first surface and the second surface, a sensor module disposed under the touch screen display and including a light emitting unit (e.g., 161 of FIG. 3A or 4A) and a light receiving unit (e.g., 162 of FIG. 1, 2A, 2B, 3A, 3C, 4A, or 4B), and a wireless communication circuit disposed in an internal space of the housing.

According to various embodiments, at least one region of the third surface may include at least one through hole arranged while forming a specified angle with the third direction.

According to an embodiment, the at least one through hole may include plurality of through holes (e.g., 10-to-n of FIG. 1 or 5) and the through holes may include an optical structure (e.g., 2 of FIG. 3A, 3B, 3C, 4A, or 4B).

According to an embodiment, a first through hole (e.g., 17 of FIG. 1, 3A, OR 3B) of the through holes may guide at least a portion of light emitted from the light emitting unit to an outside of the electronic device, based on an optical structure.

According to various embodiments, a second through hole (e.g., 19 of FIG. 1 or 3C) of the through holes may guide at least a portion of light, which is introduced from the outside of the electronic device, to the light receiving unit, based on an optical structure.

According to various embodiments, at least one region of the third surface may be curved with a specified curvature.

According to various embodiments, the first through hole may have one end formed to correspond to the central axis of the light emitting unit.

According to various embodiments, the second through hole may have one end formed to correspond to the central axis of the light receiving unit.

According to various embodiments, the optical structure may include a pattern (e.g., 3 of FIG. 3A, 3B, 3C, 4A, or 4B) formed in a specified shape to at least partially reflect at least one of the emitted light or the introduced light.

According to various embodiments, the optical structure of the first through hole may have at least one region including a convex surface (e.g., see the convex lens shape 4 of FIG. 3A, 3B, or 4A) facing the outside of the electronic device.

According to various embodiments, the optical structure of the second through hole may have at least one region including a concave surface (e.g., see the concave lens shape 5 of FIG. 3C or 4B) facing an inside of the electronic device.

According to various embodiments, at least one region of the housing may include a metal material.

According to various embodiments, the wireless communication circuit may be electrically connected with the housing.

According to various embodiments, the electronic device may further include a receiver module (e.g., 140 of FIG. 1, 2A, 2B, or 3D) disposed in the internal space of the housing.

According to various embodiments, the at least one through hole may include at least one third through hole (e.g., the third through holes 22-to-n of FIG. 1 or 5) to guide at least a portion of a sound, which is output from the receiver module, to the outside of the electronic device.

According to various embodiments, the electronic device may further include a light emitting device (LED) (170 of FIG. 1 or 2A) module disposed in the internal space of the housing.

According to various embodiments, the at least one through hole may include at least one fourth through hole to guide at least a portion of a light, which is emitted from the LED module, to the outside of the electronic device.

According to various embodiments, the first through hole, the second through hole, the third through hole, and the fourth through hole may be arranged to correspond to arrangement of the sensor module, the receiver module, and the LED module.

According to various embodiments, the third through hole may be formed with a second diameter greater than first diameters corresponding to the first through hole and the second through hole.

According to various embodiment, the receiver module may be coupled to a case (e.g., 141 of FIG. 3D or 3E) having a shape corresponding to a shape of the receiver module, and an assembly of the receiver module and the case may include an internal space (e.g., 142 of FIG. 3D) facing in the third direction.

According to various embodiments, the case may have one region including at least one sealing member (e.g., 143 of FIG. 3D or 3E).

According to various embodiments, the internal space may have at least one region which is open, and the open region may communicate with at least a portion of the third hole.

According to various embodiments, an electronic device may include a housing including a first surface facing a first direction, a second surface facing a second direction opposite to the first direction, and a third surface formed around an edge of the first surface and facing a third direction, wherein the third direction may form an acute angle with the first direction, the third surface may include a plurality of through holes arranged along the edge of the first surface, at least some of the through holes may be formed while facing the third direction, and the through holes may include a first through hole and a second through hole, a touch screen display interposed between the first surface and the second surface, a wireless communication circuit disposed in an internal space of the housing, a first light guide having a convex surface filling the first through hole and exposed to an outside of the third surface, a second light guide filling the second through hole; an infrared light source disposed in the internal space of the housing such that light from a light source passes through the first light guide, and an infrared light detector disposed in the internal space of the housing to receive at least a portion of light emitted from the infrared light source and reflected from an external object through the second light guide.

According to various embodiments, the electronic device may further include at least one of a speaker disposed in the internal space of the housing or a visible light source.

According to various embodiments, the through holes may further include a third through hole formed to allow a sound output from the speaker to pass through the third through hole.

According to various embodiments, the through holes may further include a fourth through hole formed to allow light emitted from the visible light source to pass through the fourth through hole.

According to various embodiments, the electronic device may further include a third light guide filling the fourth through hole.

The above-described electronic device according to various embodiments may include a housing including a first surface, a second surface, and a third surface defining an internal space of the housing, a touch screen display interposed between the first surface and the second surface, a sensor module disposed under the touch screen display and including a light emitting unit and a light receiving unit, and a wireless communication circuit disposed in the internal space.

According to various embodiments, the third surface may include a plurality of through holes each including optical structures, the plurality of through holes formed at a specified angle relative to a plane of the first and second surfaces.

According to various embodiments, a portion of light emitted from the light emitting unit is guided to an exterior of the electronic device through a first optical structure of a first through hole.

According to various embodiments, at least a portion of light introduced from the exterior of the electronic device is guided to the light receiving unit on a second optical structure of a second through hole.

According to various embodiments, at least a portion of the third surface defines a curve according to a specified curvature.

According to various embodiments, a central axis of the light emitting unit corresponds to one end of the first through hole.

According to various embodiments, a central axis of the light receiving unit corresponds to one end of the second through hole.

According to various embodiments, each optical structure may include a pattern formed according to a prespecified shape to at least partially reflect light.

According to various embodiments, the first optical structure of the first through hole may include at least one region having a convex surface oriented towards the exterior of the electronic device.

According to various embodiments, the second optical structure of the second through hole may include at least one region having a concave surface oriented towards an interior of the electronic device.

According to various embodiments, the housing may include at least one region formed by a metal material.

According to various embodiments, the wireless communication circuit is electrically connected with the housing.

According to various embodiments, the electronic device may further include a receiver module disposed in the internal space of the housing.

According to various embodiments, the receiver module is aligned with a third through hole such that sound output from the receiver module travels through the third through hole to the exterior of the electronic device.

According to various embodiments, the electronic device may further include a light emitting device (LED) module disposed in the internal space of the housing.

According to various embodiments, the LED module is aligned to a fourth through hole such that light emitted by the LED module travels through the fourth through hole to the exterior of the electronic device.

According to various embodiments, the first through hole, the second through hole, the third through hole, and the fourth through hole are each respectively aligned to an arrangement of the sensor module, the receiver module, and the LED module in the electronic device.

According to various embodiments, the third through hole is formed in the third surface having a diameter greater than diameters of the first through hole and the second through hole as formed within the third surface.

According to various embodiments, the receiver module is coupled to a case having a shape corresponding to a shape of the receiver module and an assembly including the receiver module coupled to the case defines an internal space oriented in a direction matching an orientation of the third surface.

According to various embodiments, the case is coupled to at least one sealing member.

According to various embodiments, the internal space further defines an opening communicating with at least a portion of the third through hole.

The above-described electronic device according to various embodiments may include a housing including a first surface, a second surface, and a third surface forming along an edge of the first surface, wherein the third surface includes a plurality of through holes arranged along the edge of the first surface, a touch screen display interposed between the first surface and the second surface, a wireless communication circuit disposed in an internal space of the housing, a first light guide having a convex surface disposed within a first through hole and exposed to an exterior of the electronic device, a second light guide disposed within a second through hole, an infrared light source disposed in the internal space such that emitted light passes through the first light guide to the exterior of the electronic device, and an infrared light detector disposed in the internal space to detect the emitted light when the emitted light passes through the second light guide after reflection by an external object.

According to various embodiments, the electronic device may further include at least one of a speaker disposed in the internal space of the housing and a visible light source.

According to various embodiments, the speaker is aligned to a third through hole such that generated sound passed through the third through hole to the exterior.

According to various embodiments, the visible light source is aligned to a fourth through hole including a third light guide, such that light emitted from the visible light source passes through the third light guide to the exterior.

Figure 6:
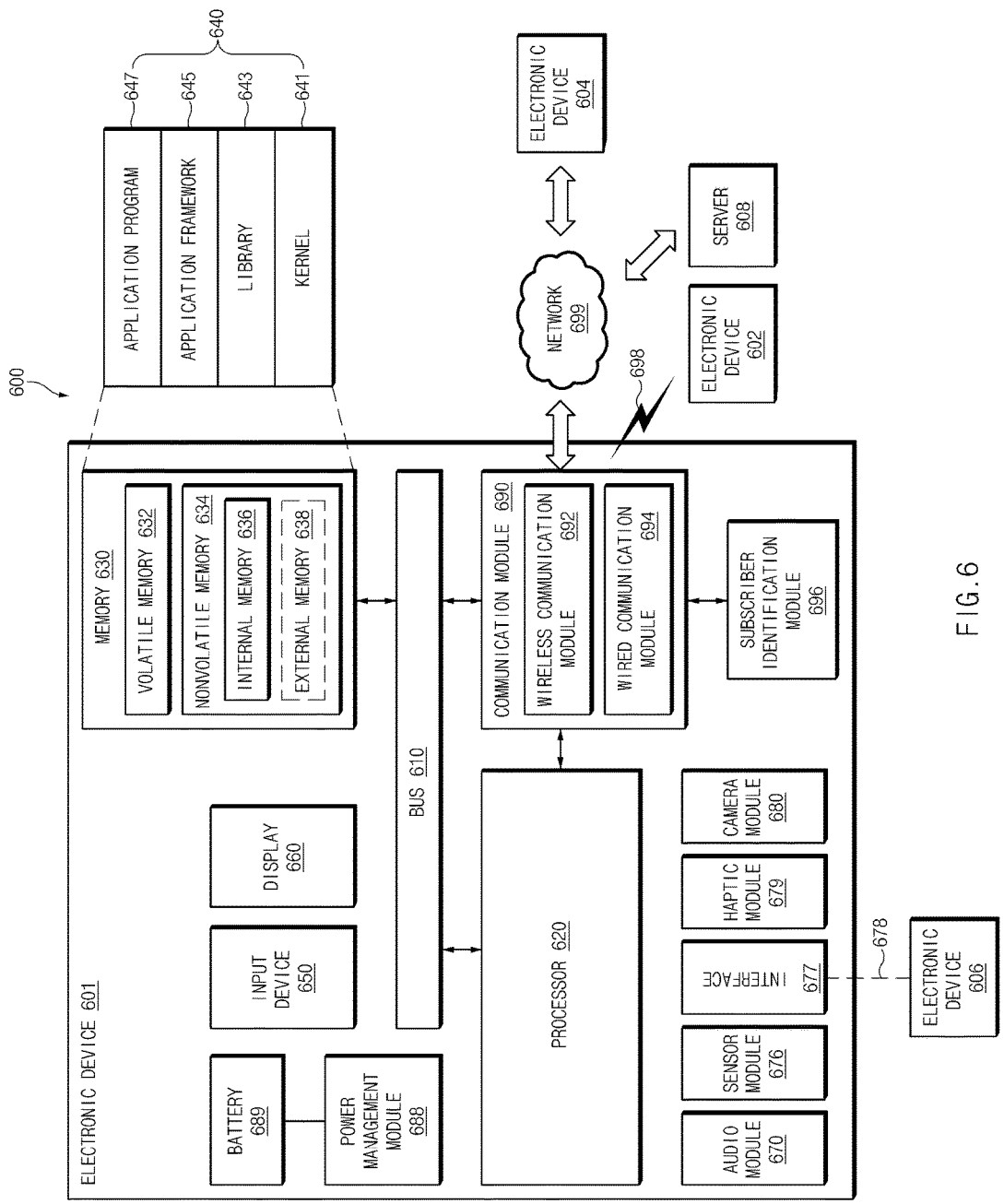
FIG. 6 is a view illustrating an electronic device in a network environment, according to an embodiment.

FIG. 6 is a view illustrating an electronic device in a network environment, according to an embodiment.

Referring to FIG. 6, under the network environment 600, the electronic device 601 (e.g., the electronic device 60 of FIG. 1) may communicate with an electronic device 602 through local wireless communication 698 or may communication with an electronic device 604 or a server 608 through a network 699. According to an embodiment, the electronic device 601 may communicate with the electronic device 604 through the server 608.

According to an embodiment, the electronic device 601 may include a bus 610, a processor 620, a memory 630, an input device 650, a display 660, an audio module 670, a sensor module 676, an interface 677, a haptic module 679, a camera module 680, a power management module 688, a battery 689, a communication module 690, and a subscriber identification module 696. According to an embodiment, the electronic device 601 may not include at least one (e.g., the display 660 or the camera module 680) of the above-described elements or may further include other element(s).

For example, the bus 610 may interconnect the above-described elements 620 to 690 and may include a circuit for conveying signals (e.g., a control message or data) between the above-described elements. The processor 620 may include one or more of a central processing unit (CPU), an application processor (AP), a graphic processing unit (GPU), an image signal processor (ISP) of a camera or a communication processor (CP). According to an embodiment, the processor 620 may be implemented with a system on chip (SoC) or a system in package (SiP). For example, the processor 620 may drive an operating system (OS) or an application to control at least one of another element (e.g., hardware or software element) connected to the processor 620 and may process and compute various data. The processor 620 may load a command or data, which is received from at least one of other elements (e.g., the communication module 690), into a volatile memory 632 to process the command or data and may store the process result data into a nonvolatile memory 634.

The memory 630 may include, for example, the volatile memory 632 or the nonvolatile memory 634. The volatile memory 632 may include, for example, a random access memory (RAM) (e.g., a dynamic RAM (DRAM), a static RAM (SRAM), or a synchronous dynamic RAM (SDRAM)). The nonvolatile memory 634 may include, for example, a one-time programmable read-only memory (OT-PROM), a programmable read-only memory (PROM), an erasable programmable read-only memory (EPROM), an electrically erasable programmable read-only memory (EE-PROM), a mask ROM, a flash ROM, a flash memory, a hard disk drive, or a solid-state drive (SSD). In addition, the nonvolatile memory 634 may be configured in the form of an internal memory 636 or the form of an external memory 638 which is available through connection if requested, according to the connection with the electronic device 601. The external memory 638 may further include a flash drive such as compact flash (CF), secure digital (SD), micro secure digital (Micro-SD), mini secure digital (Mini-SD), extreme digital (xD), a multimedia card (MMC), or a memory stick. The external memory 638 may be operatively or physically connected with the electronic device 601 in a wired manner (e.g., a cable or a universal serial bus (USB)) or a wireless (e.g., Bluetooth) manner.

For example, the memory 630 may store, for example, at least one different software element, such as an instruction or data associated with the program 640, of the electronic device 601. The program 640 may include, for example, a kernel 641, a library 643, an application framework 645 or an application program (interchangeably, "application") 647.

The input device 650 may include a microphone, a mouse, or a keyboard. According to an embodiment, the keyboard may include a keyboard physically connected or a keyboard virtually displayed through the display 660.

The display 660 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 601.

The audio module 670 may convert, for example, from a sound into an electrical signal or from an electrical signal into the sound. According to an embodiment, the audio module 670 may acquire sound through the input device 650 (e.g., a microphone) or may output sound through an output device (not illustrated) (e.g., a speaker or a receiver) included in the electronic device 601, an external electronic device (e.g., the electronic device 602 (e.g., a wireless speaker or a wireless headphone)) or an electronic device 606 (e.g., a wired speaker or a wired headphone) connected with the electronic device 601.

The sensor module 676 may measure or detect, for example, an internal operating state (e.g., power or temperature) or an external environment state (e.g., an altitude, a humidity, or brightness) of the electronic device 601 to generate an electrical signal or a data value corresponding to the information of the measured state or the detected state. The sensor module 676 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 676 may further include a control circuit for controlling at least one or more sensors included therein. According to an embodiment, the sensor module 676 may be controlled by using the processor 620 or a processor (e.g., a sensor hub) separate from the processor 620. In the case that the separate processor (e.g., a sensor hub) is used, while the processor 620 is in a sleep state, the separate processor may operate without awakening the processor 620 to control at least a portion of the operation or the state of the sensor module 676.

According to an embodiment, the interface 677 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 678 may physically connect the electronic device 601 and the electronic device 606. According to an embodiment, the connector 678 may include, for example, an USB connector, an SD card/MMC connector, or an audio connector (e.g., a headphone connector).

The haptic module 679 may convert an electrical signal into mechanical stimulation (e.g., vibration or motion) or into electrical stimulation. For example, the haptic module 679 may apply tactile or kinesthetic stimulation to a user. The haptic module 679 may include, for example, a motor, a piezoelectric element, or an electric stimulator.

The camera module 680 may capture, for example, a still image and a moving picture. According to an embodiment, the camera module 680 may include at least one lens (e.g., a wide-angle lens and a telephoto lens, or a front lens and a rear lens), an image sensor, an image signal processor, or a flash (e.g., a light emitting diode or a xenon lamp).

The power management module 688, which is to manage the power of the electronic device 601, may include at least a portion of a power management integrated circuit (PMIC).

The battery 689 may include a primary cell, a secondary cell, or a fuel cell and may be recharged by an external power source to supply power at least one element of the electronic device 601.

The communication module 690 may establish a communication channel between the electronic device 601 and an external device (e.g., the first external electronic device 602, the second external electronic device 604, or the server 608). The communication module 690 may support wired communication or wireless communication through the established communication channel. According to an embodiment, the communication module 690 may include a wireless communication module 692 or a wired communication module 694. The communication module 690 may communicate with the external device (e.g., the first external electronic device 602, the second external electronic device 604 or the server 608) through a first network 698 (e.g. a wireless local area network such as Bluetooth or infrared data association (IrDA)) or a second network 699 (e.g., a wireless wide area network such as a cellular network) through a relevant module among the wireless communication module 692 or the wired communication module 694.

The wireless communication module 692 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 692 supports cellar communication, the wireless communication module 692 may, for example, identify or authenticate the electronic device 601 within a communication network using the subscriber identification module (e.g., a SIM card) 696. According to an embodiment, the wireless communication module 692 may include a communication processor (CP) separate from the processor 2820 (e.g., an application processor (AP). In this case, the communication processor may perform at least a portion of functions associated with at least one of elements 610 to 696 of the electronic device 601 in substitute for the processor 620 when the processor 620 is in an inactive (sleep) state, and together with the processor 620 when the processor 620 is in an active state. According to an embodiment, the wireless communication module 692 may include a plurality of communication modules, each supporting a relevant communication scheme among cellular communication, short-range wireless communication, or a GNSS communication scheme.

The wired communication module 694 may include, for example, include a local area network (LAN) service, a power line communication, or a plain old telephone service (POTS).

For example, the first network 698 may employ, for example, Wi-Fi direct or Bluetooth for transmitting or receiving instructions or data through wireless direct connection between the electronic device 601 and the first external electronic device 602. The second network 699 may include a telecommunication network (e.g., a computer network such as a LAN or a WAN, the Internet or a telephone network) for transmitting or receiving instructions or data between the electronic device 601 and the second electronic device 604.

According to embodiments, the instructions or the data may be transmitted or received between the electronic device 601 and the second external electronic device 604 through the server 608 connected with the second network. Each of the external first and second external electronic devices 602 and 604 may be a device of which the type is different from or the same as that of the electronic device 601. According to various embodiments, all or a part of operations that the electronic device 601 will perform may be executed by another or a plurality of electronic devices (e.g., the electronic devices 602 and 604 or the server 608). According to an embodiment, in the case that the electronic device 601 executes any function or service automatically or in response to a request, the electronic device 601 may not perform the function or the service internally, but may alternatively or additionally transmit requests for at least a part of a function associated with the electronic device 601 to any other device (e.g., the electronic device 602 or 604 or the server 608). The other electronic device (e.g., the electronic device 602 or 604 or the server 608) may execute the requested function or additional function and may transmit the execution result to the electronic device 601. The electronic device 601 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 630).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 630) in the form of a program module. The instruction, when executed by a processor (e.g., a processor 620), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be implemented by a single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
 a housing including a first surface, a second surface, and a third surface forming an internal space of the housing;
 a touch screen display interposed between the first surface and the second surface;
 a sensor disposed in the internal space and including a light emitter and a light receiver;
 a wireless communication circuit disposed in the internal space; and
 wherein the third surface includes a plurality of through holes including a first through hole and a second through hole,
 wherein a first optical structure disposed within the first through hole includes a concave surface for concentrating external light of the electronic device to the light receiver, and the concave surface is located at a portion of the first optical structure which is exposed to an exterior of the electronic device, and
 wherein a second optical structure is disposed within the second through hole for concentrating emitted light from the light emitter to external of the electronic device.

2. The electronic device of claim 1, wherein at least a portion of the third surface includes a curved portion according to a specified curvature.

3. The electronic device of claim 1, wherein a central axis of the light emitter corresponds to one end of the first through hole.

4. The electronic device of claim 1, wherein a central axis of the light receiver corresponds to one end of the second through hole.

5. The electronic device of claim 1, wherein the second optical structure includes
 a prespecified shape surface to refract light.

6. The electronic device of claim 1, wherein the second optical structure includes a convex surface, and the convex surface is located at a portion of the second optical structure which is exposed to the exterior of the electronic device.

7. The electronic device of claim 1, wherein the housing includes at least one region formed by a metal material.

8. The electronic device of claim 1, wherein the wireless communication circuit is electrically connected with the housing.

9. The electronic device of claim 1, further comprising:
 a receiver disposed in the internal space of the housing,
 wherein the receiver is aligned with a third through hole for allowing passage of a sound output from the receiver to the exterior of the electronic device.

10. The electronic device of claim 9, further comprising:
 a light emitting device (LED) disposed in the internal space of the housing,
 wherein the LED is aligned to a fourth through hole for allowing passage of light emitted by the LED to the exterior of the electronic device.

11. The electronic device of claim 10, wherein the first through hole and the second through hole are aligned to the sensor.

12. The electronic device of claim 9, wherein a diameter of the third through hole is greater than each of diameters of the first through hole and the second through hole.

13. The electronic device of claim 9, wherein the receiver is coupled to a case which includes a space forming a path for the passage of the sound output from the receiver.

14. The electronic device of claim 13, wherein the case is coupled to at least one sealing member.

15. The electronic device of claim 13, wherein the space is connected to the third through hole.

16. The electronic device of claim 1, wherein the plurality of through holes is inclined relative to the first surface.

17. The electronic device of claim 1, wherein the first optical structure and the second optical structure include resin material based on acryl or resin.

18. An electronic device comprising:
- a housing including a first surface, a second surface, and a third surface formed along an edge of the first surface, wherein the third surface includes a plurality of through holes arranged along the edge of the first surface;
- a touch screen display interposed between the first surface and the second surface;
- a wireless communication circuit disposed in an internal space of the housing;
- a first light guide including a convex surface and disposed within a first through hole, wherein the convex surface is exposed to an exterior of the electronic device;
- a second light guide disposed within a second through hole;
- an infrared light source disposed in the internal space corresponding to the first light guide for allowing a passage of emitted light from the infrared light source to the exterior of the electronic device; and
- an infrared light detector disposed in the internal space that corresponds to the second light guide for concentrating reflected light from an external object.

19. The electronic device of claim 18, further comprising:
- at least one of a speaker disposed in the internal space of the housing and a visible light source,
- wherein the speaker is aligned to a third through hole allowing passage of sound output from the speaker to the exterior of the electronic device.

20. The electronic device of claim 19, wherein the visible light source is aligned to a fourth through hole including a third light guide allowing passage of light emitted from the visible light source to the exterior of the electronic device.

* * * * *